July 30, 1957 J. B. GRAY III, ET AL 2,801,329
ASSEMBLY FIXTURE
Filed Nov. 29, 1955 4 Sheets-Sheet 1

INVENTORS
J. B. GRAY III
W. R. YEICH
BY
ATTORNEY

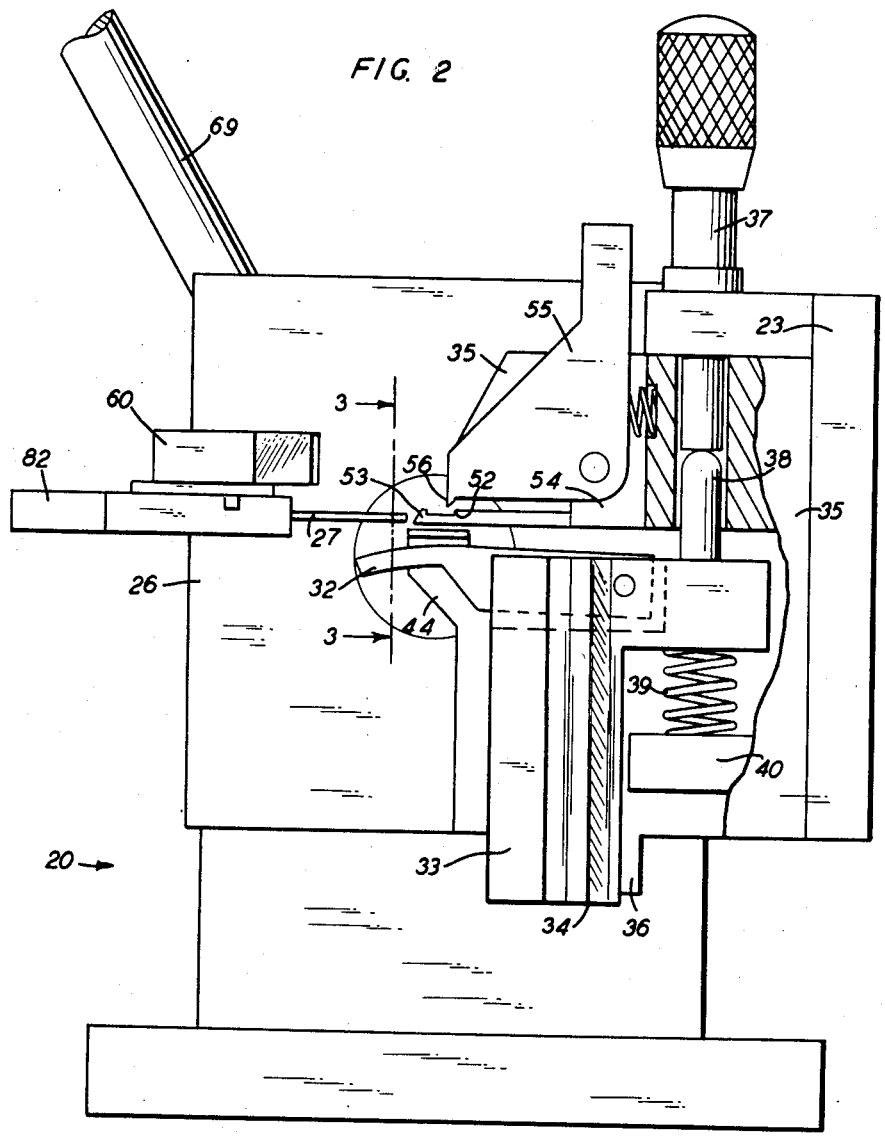

July 30, 1957  J. B. GRAY III, ET AL  2,801,329
ASSEMBLY FIXTURE
Filed Nov. 29, 1955  4 Sheets-Sheet 3
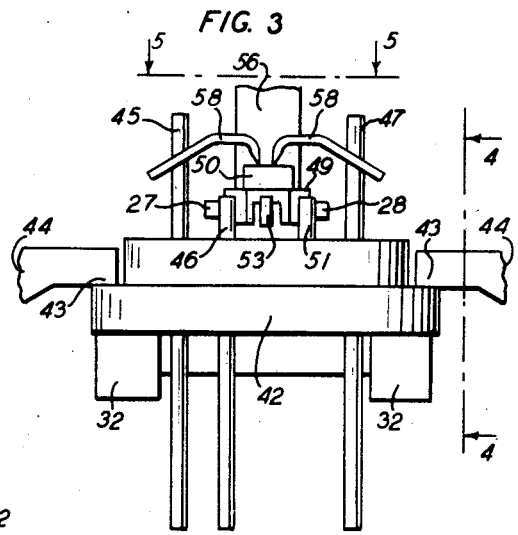
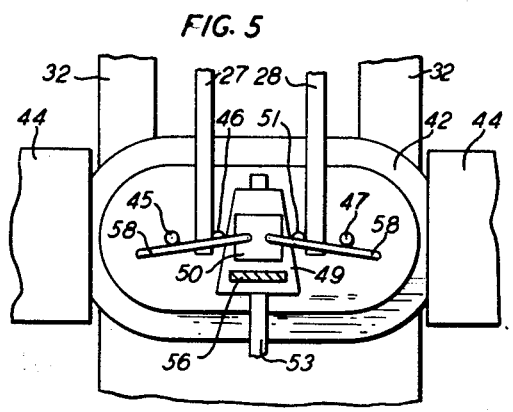
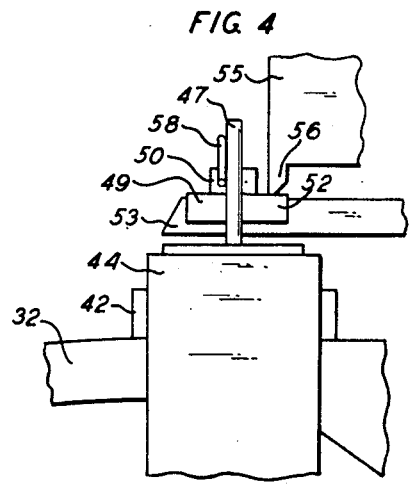
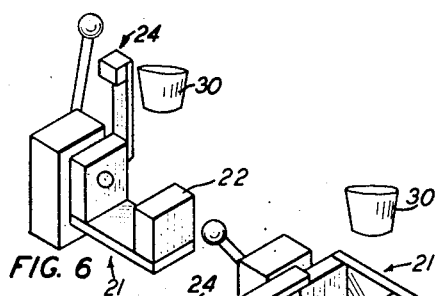
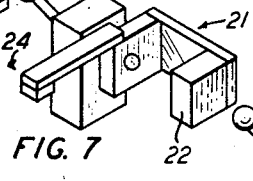
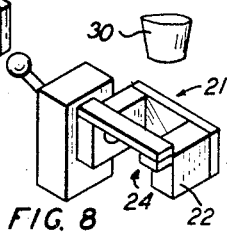
INVENTORS
J. B. GRAY III
W. R. YEICH
BY
W. C. Parnell
ATTORNEY

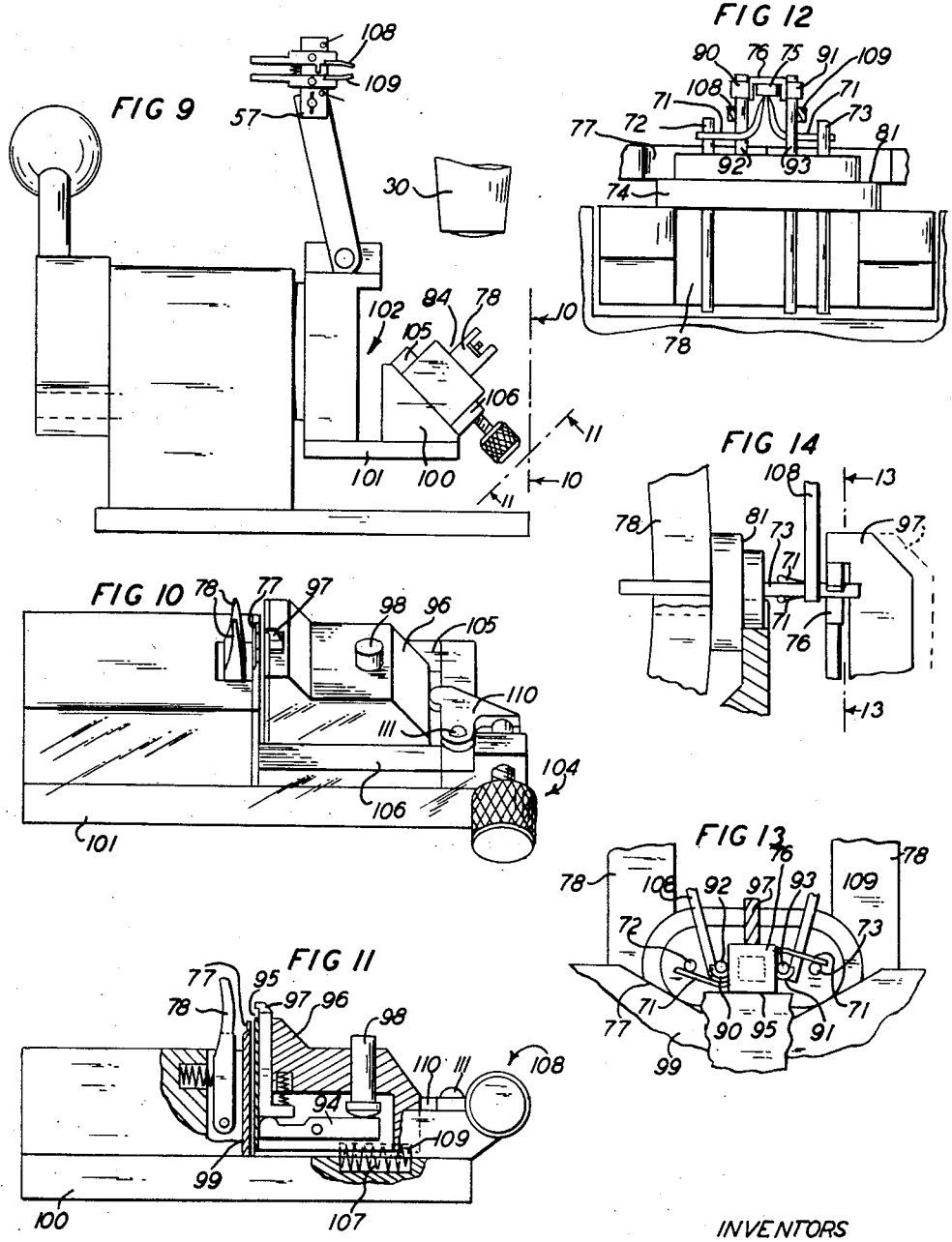

United States Patent Office 2,801,329
Patented July 30, 1957

2,801,329
ASSEMBLY FIXTURE

John B. Gray III and William R. Yeich, West Lawn, Pa., assignors to Western Electric Company, Incorporated, New York, N. Y., a corporation of New York Application November 29, 1955, Serial No. 549,695

5 Claims. (Cl. 219—101)

This invention relates to an assembly fixture and particularly to a fixture for assembling point contact devices such as transistors.

In the manufacture of certain types of hermetically sealed point contact devices, a semi-conductor wafer is first mounted on a metal base member and pointed wire electrode or contact members are mounted in fixed relation to upright support wires extending from a header member which also has a pair of support wires between the contact member supports to which the base member is mounted. In final assembly, a can is soldered to a flanged outer rim of the header to make an airtight container therewith for the transistor elements. The copending application of J. B. Gray, Serial No. 549,694, filed November 29, 1955, discloses a fixture for accurately soldering or welding the point contact or electrode wires to the upright supports therefor on the header.

The object of this invention is an assembly fixture for facilitating the accurate positioning and attaching of the base members of such devices to their support members.

According to the general features of the invention the parts assembly portion of the fixture is rotatably mounted to permit convenient loading and adjusting in one position and be visually checked and welded in another where welding electrodes may be moved through a free path to perform the operation. In one embodiment the fixture utilizes individual supports for both the header and the base members for positioning the base members in sliding engagement with the header supports therefor, an adjusting mechanism being provided for accurately moving one of the supports to accurately compress the point contacts against a semi-conductor wafer on a base member. A pair of welding electrodes mounted on a pivoted arm are rotatable into engagement with the supports for the base member to serially connect the base member and the supports in a resistance welding circuit to fuse the base member to the supports.

These and other features of the invention will be more fully understood from the following detailed description taken in conjunction with the accompanying drawing, in which:

Fig. 2 is an enlarged, partially broken side view of the device of Fig. 1 thereof with the movable parts support platform rotated to the position shown in Fig. 7;

Fig. 3 is an enlarged view of a portion of Fig. 2 shown along the plane of line 3—3 thereof showing a header and base member mounted therein and the welding electrodes positioned for welding;

Fig. 4 is an enlarged view of the structure of Fig. 3 as shown along the plane of line 4—4 thereof;

Fig. 5 is a plan view of the structure of Fig. 3;

Figs. 6, 7 and 8 are simplified perspective views of the fixture showing the different positions of operation thereof;

Fig. 9 is a side elevational view of another embodiment of the invention;

Fig. 10 is an enlarged view of the device of Fig. 9 as seen along the plane of line 10—10;

Fig. 11 is a partially broken view of the device of Fig. 10 as seen along the plane of line 11—11 in Fig. 9;

Fig. 12 is an enlarged view of the support means of the fixture of Fig. 9 showing a base member and header positioned therein;

Fig. 13 is a plan view of the apparatus as seen in Fig. 12, and

Fig. 14 is a partially broken, side elevational view of the device shown in Fig. 12.

Figure 1:
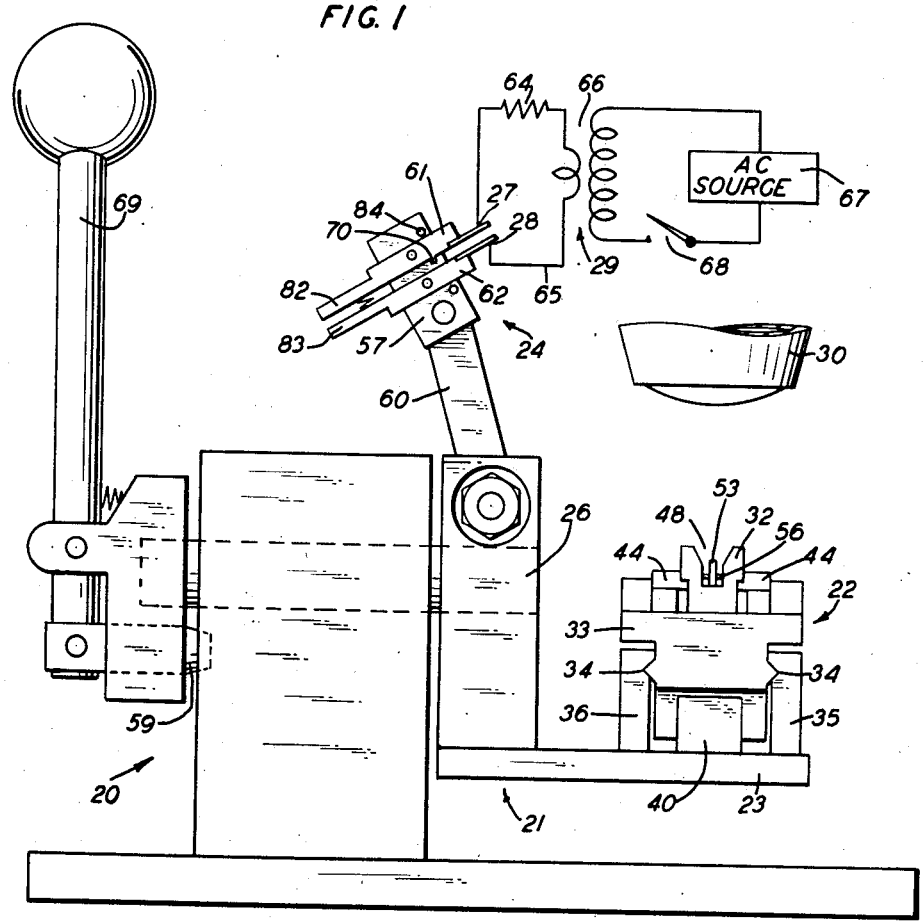
Fig. 1 is a side elevational view of a fixture according to the invention which may be used in assembling point contact type transistors.

The fixtures shown in Figs. 1 through 6 are adapted for use in the assembly of the Western Electric Company type 1894 transistors, the principal parts of which may be seen in Figs. 3 and 5. This transistor includes a header 42 having wires 45, 46, 51 and 47 hermetically sealed therein for supporting a base member 49, on which a semi-conductor wafer 50 is soldered, and opposing point contact wires 58 which are in pressure contact with the upper surface of the wafer. The fixture includes a fixed support frame 20 having a rotatable L-shaped support member 21 mounted thereon with a parts supporting and adjusting structure 22 on a platform 23 or the lower horizontal portion of the L-shaped member, and a pivotally mounted welding electrode support member 24 on the vertical portion 26 of the L-shaped member. Welding electrodes 27 and 28 on member 24 are connected in a resistance welding circuit 29 and a microscope which is supported on the frame 20 is positioned over the structure 22 to permit viewing the parts being assembled thereon. Only the objective lens 30 of the microscope is shown in the drawing and the support structure holding the microscope to the member 20 is omitted to simplify the drawing.

The parts supporting and adjusting structure 22 includes a spring biased clamping member 32 pivotally attached to a block 33 which is slidably mounted in dovetail engagement in the ways 34 of side members 35 and 36 which in turn are fixed to and extend upwardly (as seen in Fig. 1) from platform 23. The block 33 is movable within the ways 34 by means of a micrometer screw 37 in a fixed member 54 between side members 35 and 36, which engages a pin 38 protruding from block 33. The block is held in pressure contact with the movable end of the micrometer screw by a biasing spring 39 compressed between a fixed member 40 on the platform 23 and the block. The clamp 32 holds a header member 42 against flanges 43 extending from member 44 on either side of the block 33 to support the header therein with the wires 45, 46 and 47 positioned within a slot 48 in the clamp 32. This header then is moved with block 33 by adjusting the micrometer screw 37.

The transistor base member 49, to which a semi-conductor wafer 50 is soldered, is wedge shaped for positioning between wires 46 and 51 extending from header 42. A base member 49 is positioned on the end of finger 53 extending from the member 54 and is clamped thereto by clamp 55 on member 54 which is spring biased to permit a beveled jaw portion 56 thereof to make contact with the top side of the base member. A shoulder 52 (Fig. 4) on the finger, against which the base member is positioned accurately, locates the base in the fixture.

In loading the fixture, a base member 49 is first loaded over finger 53 against shoulder 52 and held in position by clamp 55. A header 42 is then pushed down between flanges 43 of members 44 and clamp 32 until the header wires 46 and 51 make contact with the opposing inclined sides of the base member 49. Prior to loading, the micrometer screw 37 must be pre-set to a position which will permit loading the header without disturbing the contact wires 58 which have been pre-adjusted. When the two parts are loaded, the micrometer is adjusted until the points of the contact wires engage the surface of the wafer 50. Micrometer 37 is then turned a prescribed additional amount to produce the required compression of the point contacts against the wafer. The base member 49 is then in position for welding to the wires 46 and 51 which will be discussed below.

A pair of welding electrodes 27 and 28 are insulatedly mounted in spring biased holders 61 and 62, respectively, on an adjustable member 57 at the ends of arm 60 which is pivotally mounted on the vertical portion 26 of the L-shaped member 21. The holders are normally urged toward one another, a pin stop 70 extending from the holder 61 keeping the electrodes at a prescribed separation. The electrodes 27 and 28 are connected through leads 64 and 65 (shown schematically) to the secondary winding of a welding transformer 66, the primary winding of which is connected to an alternating current source 67 through a control switch 68. Once the parts have been adjusted as described above, with the arm 60 in its raised position away from the structure 22 as seen in Fig. 6, lever 69 is then turned approximately 90 degrees to rotate the support 21 into position for welding as seen in Fig. 7. Holes (not shown) in the support 20 are provided for receiving a pin 59 which is reciprocably carried at the lower end of the lever 69 for locking the support 21 in either of the adjustable positions. The welding arm 60 is pivoted to move it into the position shown in Fig. 8 for the welding operation. This is done by grasping the electrode holder extensions 82 and 83 and clamping them together so that the holders 61 and 62 bear against pin stops 84 and 85, respectively, which accurately locates the electrodes to permit their entry between wires 45 and 46 on the one side, and 51 and 47 on the other side as the arm 60 is swung around. The member 57 is fastened on arm 60 to permit these parts to be aligned for this operation. The extensions 82 and 83 are then released and the electrodes 27 and 28 are compressed against the wires 46 and 51, respectively. The switch 68 of the welding circuit is then closed to make two welds in series between wire 46 and base member and between the base member and wire 51. Arm 60 is then pivoted back to its standby position as shown in Fig. 7. The platform 23 rotated to its original position and the clamps 32 and 53 opened to permit removal of the welded base member-header assembly. Instead of using a switch 63 in this welding circuit, relay contacts controlled by a timer may be utilized to accurately time the welding cycle in a conventional manner.

A second embodiment of the invention adapted for welding the base members 76 of a Western Electric Company type 1893 transistor to a header 74 is shown in Figs. 9 through 14. The 1893 type transistor differs from the 1894 type in that the point contact wires 71 extend upwardly from wire supports 72 and 73 of the header to engage a wafer 75 soldered on the underside of the base member 76 which is generally rectangular or square in shape and has flanged portions 90 and 91 which are welded to support wires 92 and 93, respectively. In this fixture the part supporting and adjusting structure 84 on platform 101 is mounted on an angle with respect to the objective lens 30 to facilitate observing the contact wires under the base member 76. In this fixture the base member 76 is clamped between the surface 95 of a movable block 96 and a clamping member 97 which is spring biased and actuated by a push button 98 through a pivoted lever 94. The header 74 is clamped between a clamping member 78 and a V notch 77 in a fixed member 99 extending from an inclined base member 100 on the platform 101 of L-shaped member 102. In this embodiment the header is held in fixed position while the base member is movable by means of a screw mechanism 104 for moving the member 96 within ways provided therefor in side members 105 and 106. A spring 107 in the inclined base member 100 is compressed against the shoulder 109 (dashed line in Fig. 11), to hold the block 96 against an actuator element 110 which is rotated about its pivot 111 by the screw mechanism 104 to move the block.

The fixture is operated in a manner similar to the fixture of Fig. 1, the base member 76 being loaded first and then the header. The electrode support structure in this fixture has been offset angularly to permit the electrodes 108 and 109 to be aligned with the openings between wires 72 and 92 and 73 and 93, respectively.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A fixture for assembling point contact devices in which a header member has a plurality of wires extending therefrom for supporting at least one resilient electrode and a metal base member having a wafer thereon, the end of the electrode being in pressure contact with the wafer, said fixture comprising a fixed frame, a rotatable platform on the frame, means for locking the platform in rotated positions, a parts-supporting and adjusting structure on the platform including a first clamping means for receiving the metal base members, a second clamping means for receiving the header members and for holding at least two of the support wires thereof slidably against a base member in the first clamping means, means for adjustably moving one of the clamping means to position a base member along the header support wires to compress the electrode against the wafer, a pair of welding electrodes, a support for the electrodes pivotally mounted on the rotatable platform for moving the electrodes into contact with the base member support wires for serially connecting the base member support wires and the base member in a resistance welding circuit to weld the base member to the support wires and optical viewing means on the fixed support for observing the relative positioning of the base member along the header support wires.

2. A fixture, according to claim 1, in which the first clamping means are slidably mounted on the rotatable platform and the means for adjustably moving the first clamping means includes a micrometer screw, having a movable element, mounted on the platform and spring biasing means for holding the first clamping means in contact with the movable element of the micrometer screw.

3. A fixture, according to claim 1, in which the second clamping means are movable, the rotatable platform having ways for slidably positioning the second clamping means, and means for adjustably moving the second clamping means includes a spring for holding the second clamping means against the adjusting means therefor.

4. A fixture for assembling a point contact device of the type including a header with spaced support wires extending therefrom for a metal base having a wafer thereon and a resilient electrode held in pressure contact with the wafer, which comprises a main support member, a holder on the support for such a header, a holder on the support for such a base, means for effecting a relative movement between the holders and thereby between a header and a base supported thereon to cause the electrode affixed to a wire on the header to be compressed against the wafer on the base and means for welding the base to the support wires therefor while the electrode and wafer are held in such relationship including an arm pivotally mounted on the support member movable towards and away from the holders, welding electrodes on the arm, preset locating means on the arm for positioning the welding electrodes adjacent the base support wires when the arm is rotated toward the holders and resilient means for urging the electrodes into contact with the adjacent base support wires.

5. A fixture for assembling a point contact device of the type including a header with spaced support wires extending therefrom, a metal base supported between two of the wires and having a wafer thereon, a resilient electrode on another of the wires and held in pressure contact with the wafer, which comprises a main support member, a holder on the support for such a header, a holder on the support for such a base, means for effecting relative movement between the holders and thereby between a header and a base supported thereon to cause the electrode affixed to a wire on the header to be compressed against the wafer on the base, and means for welding the base to the support wires therefor while the electrode and wafer are held in such relationship including an arm pivotally mounted on the support member movable toward and away from the holders, a pair of welding electrodes, opposed holders for the electrodes pivotally mounted on the arm, spring biasing means for normally urging the electrodes toward one another, hand operable extensions for the holders for separating the electrodes, and stop elements on the arm for accurately positioning the holders in separated positions for aligning the electrodes adjacent opposite sides of the respective support wires for the base when the arm is rotated toward the holders.

References Cited in the file of this patent

UNITED STATES PATENTS

| | | |
|---|---|---|
| 2,602,872 | Ziegler | July 8, 1952 |
| 2,608,745 | Barry | Sept. 2, 1952 |